Dec. 8, 1964  J. O'BROCHTA ETAL  3,160,648
9,9-BIS(3'-ISOCYANATOPROPYL)FLUORENE
Filed Aug. 2, 1961
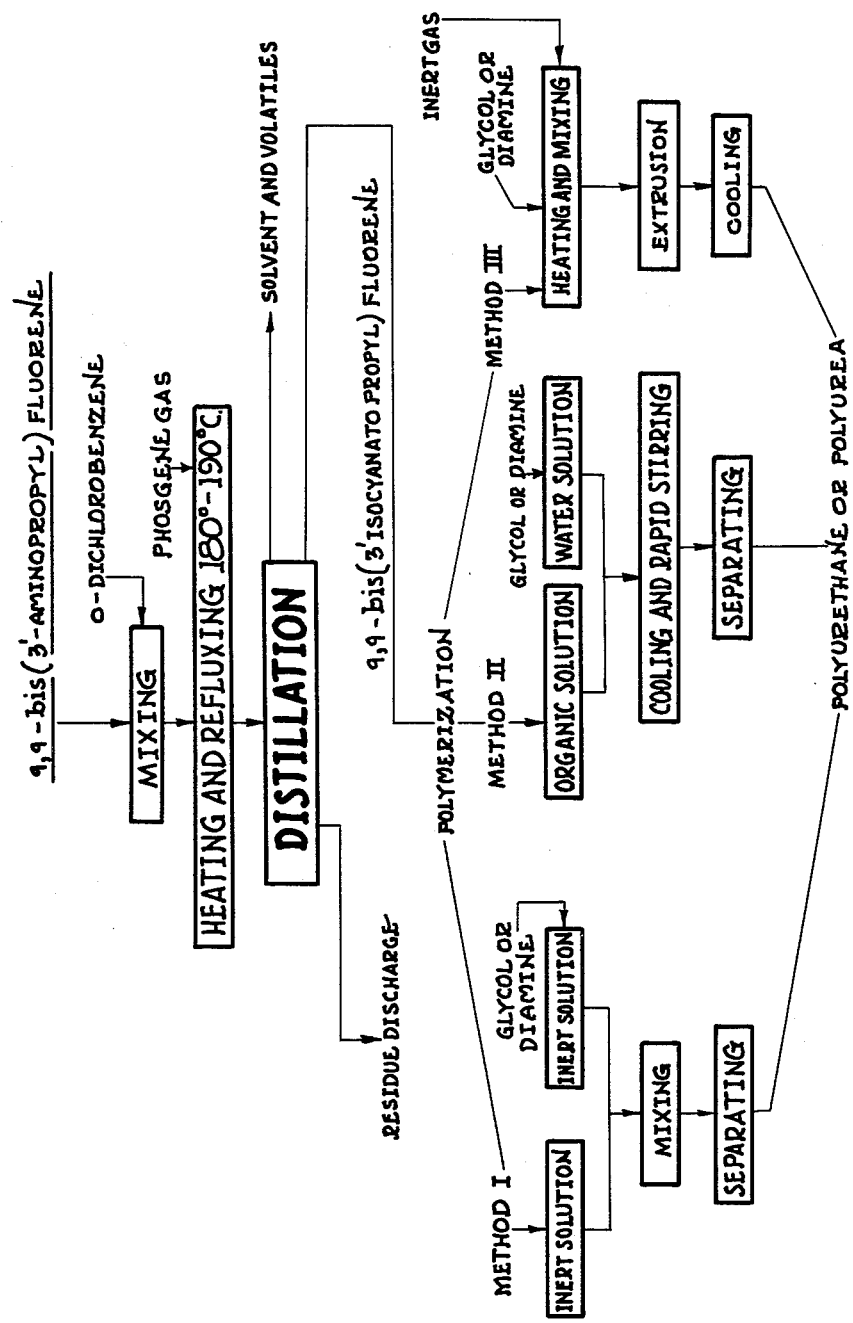
INVENTORS.
JOHN O'BROCHTA,
SAMUEL C. TEMIN.
BY
Oscar B Brumback
their
ATTORNEY.

United States Patent Office 3,160,648
Patented Dec. 8, 1964

3,160,648
9,9-BIS(3'-ISOCYANATOPROPYL)FLUORENE
John O'Brochta and Samuel C. Temin, Pittsburgh, Pa., assignors to Koppers Company, Inc., a corporation of Delaware
Filed Aug. 2, 1961, Ser. No. 128,823
1 Claim. (Cl. 260—453)

This invention relates to a new compound containing a fluorene nucleus and to polymers made therefrom. In one specific aspect, it relates to a novel diisocyanate compound containing a fluorene nucleus and to the dimensionally stable polyureas and polyurethanes made from this diisocyanate.

Linear polyurethanes and polyureas produced by the reaction of a diisocyanate with a dihydroxy compound and a diamine respectively, are well known. The prior art describes several of these polymers particularly those composed for the most part of aliphatic chains. One example was an article of commerce sold abroad under the name of Perlon U. This polyurethane, prepared by condensing hexamethylene diisocyanate with butandiol, was a crystalline opaque polymer with a melting point under 200° C. and with a glass temperature of under −30° C. Various polymers have been proposed as fiber formers but none had properties with sufficient advantages to be of commercial use.

Quite surprisingly, we have discovered a new class of polyureas and polyurethanes, containing a fluorene nucleus and offering unusual combination of properties when shaped into molded articles. It is believed that the structural differences of our novel polymers as compared to the "urethanes" having polyester linkages are responsible for these unusual properties. Uniquely combining the features of partial aromatic and aliphatic character the novel polyurethanes have a structural configuration of

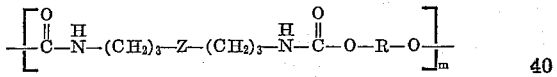

and the novel polyureas have a structural configuration of

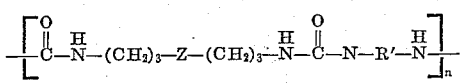

wherein Z is a fluorene nucleus and $m$ and $n$ are integers greater than ten.

A distinguishing feature from most commercial "urethanes" is that the commercial "urethanes" have, in addition to the polyurethane structure, numerous ester and ether linkages. Unlike polymers produced using other commercial diisocyanates possessing aromatic character, the functional groups of the novel polymers are not linked directly to the aromatic nucleus. In 2,4-tolylene diisocyanate, diphenylmethane-4,4'-diisocyanate and naphthalene-1,5-diisocyanate, where the polymers are directly attached to the aromatic ring, the polymers, particularly polyureas, tend to be brittle. The geometric stiffness of the chain and lack of internal mobility of the polymer, both of which contribute to a desirable high second order transition temperature or glass temperature, can be excessive in these instances.

The diisocyanate of our invention is further distinguished from completely aliphatic diisocyanates, such as hexamethylene diisocyanate or 1,4-butane diisocyanate. These aliphatic diisocyanates do not confer upon amorphous polymers the desirable properties of chain stiffness and high free volume which contribute to high glass temperatures or high softening point. In contrast, the diisocyanate of our invention, which incorporates the bulky fluorene side group, produces amorphous polymers of high glass temperature or high softening point.

The unusual chemical and physical properties exhibited by our novel polymer are chain stiffness, high softening point, toughness and transparency. In particular, the transparency and high softening point of these novel polymers lead to applications in various fields. Transparent sections requiring high impact strength and stability to temperature change may be produced, such as, plastic shields for television picture tubes, unbreakable plastic lenses, and transparent cockpit canopies used in planes traveling at supersonic speeds. The novel polymers may also be used as elastomers to manufacture gaskets and sealants able to withstand considerable temperature changes and in rubber formulation to improve the wear and chemical resistance of the material.

It is, therefore, an object of the present invention to provide a diisocyanate compound containing a fluorene nucleus which is highly reactive and exhibits the property of chain stiffness. It is a further object to provide clear, transparent and tough polyureas and polyurethanes stable to changes in temperature.

In accordance with this invention, we have discovered a new compound, 9,9-bis(3'-isocyanatopropyl)fluorene, containing isocyanate groups and a bifunctional fluorene nucleus of the formula

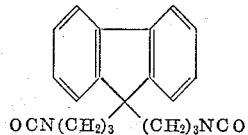

We have further discovered tough transparent polymers produced by reacting 9,9-bis(3'-isocyanatopropyl)fluorene with a member selected from the group consisting of a diamine of the formula $R(NH_2)_2$, a dihydroxy compound of the formula $R'(OH)_2$, and water; wherein R is a divalent radical selected from the group consisting of lower alkylene of up to 10 carbon atoms, oxybisphenyl, dialkylphenylene, xylylene, hexahydroxylylene, methylenebis(phenyl), 9,9-fluorenylbis(3-propyl), N,N'-piperazinylbisalkyl, and 6-alkoxy-2,4-triazinyl; wherein R' is a divalent radical selected from the group consisting of lower alkylene of up to 10 carbon atoms, oxybisalkyl wherein each carbon chain consists of from 3 to 6 carbon atoms, phenylene, lower alkylphenylene, oxybisphenyl, xylylene, alkylenebisphenyl, hexahydroxylylene, N,N'-piperazinylbisalkyl and 9,9-fluorenylbis(3-propyl).

Some preferred examples of diamines and dihydroxy compounds used in the preparation of the polymer are illustrated by the following chart.

| Diamines | Glycols |
|---|---|
| $H_2N(CH_2)_nNH_2$ where $n=4,6,10$ | $HO-(CH_2)_n-OH$ where $n=3,4,5$ or $6$ |
| $NH_2CH_2-\underset{}{\bigcirc}-CH_2NH_2$ | $HO-CH_2-\underset{CH_3}{\overset{CH_3}{\underset{|}{\overset{|}{C}}}}-CH_2-OH$ |
| $H_2N-\bigcirc-O-\bigcirc-NH_2$ | $\underset{HOCH_2}{}\bigcirc-CH_2OH$ |
| triazine with $H_2N-C$, $C-NH_2$, $OR$ | $HO-\bigcirc-\underset{CH_3}{\overset{CH_3}{\underset{|}{\overset{|}{C}}}}-\bigcirc-OH$ |
| $NH_2-(CH_2)_3-O-(CH_2)_3NH_2$ | $HOCH_2-\bigcirc S \bigcirc-CH_2OH$ |
| fluorene with $H_2NCH_2CH_2CH_2$ $CH_2CH_2CH_2NH_2$ | fluorene with $HOCH_2CH_2CH_2$ $CH_2CH_2CH_2OH$ |
| piperazine: $\underset{CH_2-CH_2}{\overset{CH_2-CH_2}{NH\phantom{xx}NH}}$ | $HO-CH_2-CH_2-N\underset{CH_2-CH_2}{\overset{CH_2-CH_2}{}}N-CH_2-CH_2OH$ |

The accompanying drawing, while not intended as a definition, essentially illustrates the invention. The drawing shows the preparation of the starting compound and the methods for producing the novel polymers. A full discussion is set forth below.

The starting compound from which the novel polymers are derived contains two aliphatic isocyanate chains attached to a polycyclic fluorene nucleus. This compound, 9,9-bis(3'-isocyanatopropyl)fluorene, is prepared by reacting the dihydrochloride of 9,9-bis(3'-amino propyl)fluorene, suspended in an inert solvent such as dichlorobenzene, with phosgene gas while the mixture is being refluxed at a temperature of 180–190° C. After removing the solvent and other volatile material, the diisocyanate is recovered by distilling the residue at 3 mm. Hg pressure and at a temperature of 225–230° C.

Preparation of the novel polymers may be accomplished by conventional methods. Three preferred methods used for polymerization are: Method I involves reacting in an inert solvent; Method II by interfacial polycondensation; and Method III employs melt polymerization.

Method I involves dissolving the reactants in inert solvents hereinafter described; the dissolved reactants are combined to produce the polymer.

In Method II, the fluorene compound is dissolved in an inert organic solvent while the diamine and the dihydroxy compound are dissolved in an aqueous medium; the two solutions are mixed resulting in polymerization taking place at the interface between the two solvents.

The reactants are melted in Method III and combined by constant stirring to produce the polymer. Henceforth, these methods will be designated by their Roman numerals.

All three methods have some reaction conditions in common. The reactions are usually run at atmospheric pressure, and there is no necessity for combining the reactants in a special order. The mole ratios of the reaction between the diisocyanate and the diamine or dihydroxy compound are about 1:1. A catalyst, such as a tertiary amine, is useful in the reaction between a diisocyanate and a dihydroxy compound, but none is required for the reaction with a diamine. Except for Method II where the yield is between 50–95%, usually above 90%, the yield is quantitative.

The other reaction conditions vary with the method used. In Method I the concentration of reactants, diamine or glycol and diisocyanate, ranges from about 5–40%, preferably 15–25%. The temperature range is from about room temperature to 200° C.; a lower temperature is used for polyureas than for polyurethanes, preferably 50–150° C. Useful inert solvents are oxygenated hydrocarbon solvents such as dimethylformamide and dimethylsulfoxide, and aromatic hydrocarbons such as chlorobenzene and cresol.

The aqueous phase of Method II contains sodium hydroxide in a concentration of about 2–20%, preferably 4–10%, and contains the diamine or diamine hydrochloride in a concentration of about 5–20%, preferably 10–15%. The organic phase contains the diisocyanate in a concentration of from about 5–30%, preferably 10–20%. Useful organic solvents include halogenated hydrocarbons, e.g., chlorobenzene, methylene chloride, chloroform, carbon tetrachloride; and aromatic hydrocarbons, e.g., benzene, toluene and xylene.

The melt polymerization described in Method III must be performed in an inert atmosphere, such as nitrogen. The temperature range under which the reaction occurs is from about 100°–300°, preferably about 25° above the softening point of the polymer to be formed.

My invention is further illustrated by the following examples:

EXAMPLE I

*Preparation of 9,9-Bis (3'-Isocyanatopropyl) Fluorene*

Seven hundred and four grams of the dihydrochloride of 9,9-bis (3'-aminopropyl) fluorene is suspended in 1500 ml. of anhydrous o-dichlorobenzene and stirred while the mixture is heated to reflux temperature (180–190° C.). Phosgene gas is then bubbled through the refluxing mixture for 14 hours. After 12 hours a clear solution is affected in the o-dichlorobenzene solution. The solvent and other volatiles are then removed by heating at 10 mm. Hg pressure until a pot temperature of 260° C. is reached. The residue is distilled at 3 mm. Hg pressure and, at about 225–230°, 591 g. of 9,9-bis (3'-isocyanatopropyl) fluorene is obtained. This represents a yield of 89% of the theoretical amount based on the diamine used. The diisocyanate solidified to give a substance which is soluble in toluene and methyl ethyl ketone and melted at 77–80° C.

EXAMPLE II

*Preparation of Polyurea Using Inert Solvent*

A solution of 30.433 parts of 9,9-bis (3'-isocyanatopropyl) fluorene in 150 parts of dimethylformamide is added to a rapidly stirred solution of 28.040 parts of 9,9-bis(3'-aminopropyl) fluorene in 150 parts of dimethylformamide at 25° C. The resulting solution is stirred for one hour and then added to 1000 parts of water which is violently agitated. A white powder is obtained which is separated by filtration and washed with water and methanol. The solid is dried in vacuo at 60–70° C. to yield 50 parts of a polymer with the structure

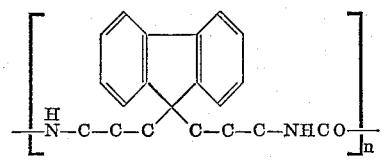

The polymer does not soften on a heated metal block below 190° C.

EXAMPLE III

*Preparation of Polyurea Using Inert Solvent*

To a solution of 16.5 parts of bis(gamma-aminopropyl) ether in 150 parts of m-cresol is added, dropwise, a solution of 30.4 parts of 9,9-bis(3'-isocyanatopropyl)fluorene in 100 parts of methyl ethyl ketone. The solution is stirred and maintained at a temperature of about 100° C. while nitrogen is passed through. The methyl ethyl ketone is permitted to distill away as the reaction proceeds. After all of the diisocyanate has been added, the temperature of the cresol solution is raised to 190–200° C. and maintained there for 16 hours. An atmosphere of nitrogen is maintained above the liquid. The solution is allowed to cool and is then added to a 2000 parts methanol with vigorous agitation. The polymer precipitates and is isolated by filtration. It is washed with methanol and methyl ethyl ketone and dried in vacuo at 60–70° C. The yield of white polymer, of structure shown below, is 42 parts.

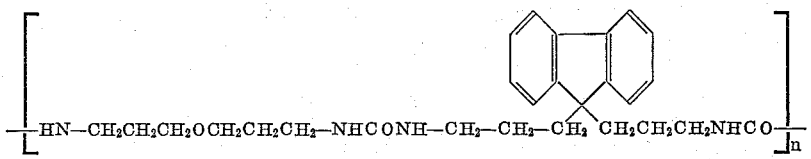

EXAMPLE IV

*Preparation of a Polyurethane Using an Inert Solvent With Precipitation on Cooling*

To a refluxing solution of 21.31 parts of 1,4-cyclohexanedimethanol (HOCH$_2$—C$_6$H$_{10}$—CH$_2$OH obtained as a 32.2:67.8 cis/trans mixture by hydrogenation of dimethyl terephthate) in 50 parts of chlorobenzene, is added, with stirring and addition of nitrogen over a period of 6 hours, a solution of 30.43 parts of 9,9-bis(3'-isocyanatopropyl)fluorene in 100 parts of chlorobenzene. The solution is refluxed for an additional 2 hours and then allowed to cool. After decanting the solvent, the precipitate is washed with methyl ethyl ketone and then redissolved in 400 parts of dimethylsulfoxide. The solution is filtered and added to 2000 parts of water with vigorous agitation. The precipitated polymer is isolated by filtration and thoroughly washed with water and methyl ethyl ketone. The yield of polyurethane is 42 parts. It has the structure

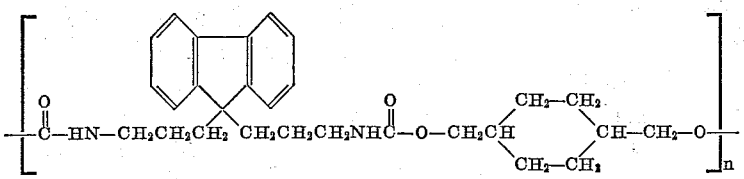

EXAMPLE V

*Preparation of a Polyurea by Interfacial Polycondensation*

A solution of 189.2 parts of the dihydrochloride of hexamethylene diamine in 2000 parts of water is cooled to about 5° C. To this cold solution is added a solution of 304.3 parts of 9,9-bis(3'-isocyanatopropyl)fluorene in 2000 parts of toluene. The reaction mixture is cooled by an external ice-water bath and rapidly stirred while 2000 parts of a cold 1 N sodium hydroxide solution is added over a period of one hour. Stirring is continued for 3 hours while the temperature is allowed to rise to room temperature. The mixture is filtered to obtain 336 parts of a white solid polymer with the structure

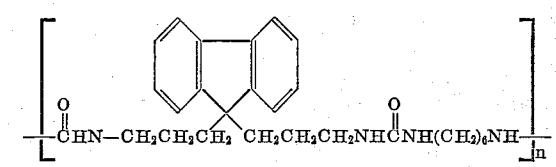

EXAMPLE VI

*Preparation of Polymer by Melt Polymerization*

To a stainless steel reaction pot, fitted with a bottom valve and heated with a glas-col mantle, is added 90.03 parts of 1,4-butanediol. The glycol is stirred by a spiral-shaped stainless steel stirrer. The vessel is fitted with a thermometer well, nitrogen inlet, exit port, and a heated dropping funnel. The glycol is heated to 80°, stirring and nitrogen flow begun, and 30.43 parts of molten 9,9-bis(3'-isocyanatopropyl)fluorene added over a period of 30 minutes. The temperature is gradually raised so that the temperature of the reaction mixture is 240–250° C. by the time the addition of diisocyanate is complete. The rise in temperature is assisted by the exothermicity of the reaction. After stirring and heating for three hours, the viscous melt is discharged through an ⅛ inch orifice at the bottom of the reaction vessel into a vessel containing cold water. A strong, transparent, rod of polymer is obtained which can be chopped into pieces about ¼ inch long by feeding into a Wiley mill. The polyurethane has the structure

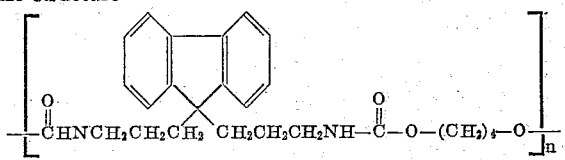

EXAMPLE VII

*Preparation of a Polyurea by Reacting With Water*

Two parts of 9,9-bis(3'-isocyanatopropyl)fluorene are dissolved in 100 parts of methyl ethyl ketone. This solution is added dropwise to 100 parts of vigorously agitated distilled water at an initial temperature of 60° C. After 30 minutes a finely divided white precipitate is obtained which is filtered and then washed with acetone. The yield of polyurea of the structure

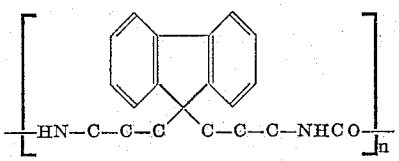

is 1.5 parts.

We claim:
9,9-bis(3'-isocyanatopropyl)fluorene

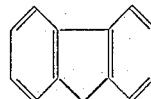
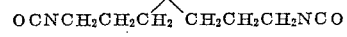

References Cited by the Examiner
UNITED STATES PATENTS

| | | | |
|---|---|---|---|
| 2,320,029 | 5/43 | Bruson | 260—570.8 |
| 2,394,597 | 2/46 | Dickey | 260—453 |
| 2,511,544 | 6/50 | Rinke et al. | 260—77.5 |
| 2,531,392 | 11/50 | Breslow | 260—77.5 |
| 2,611,782 | 9/52 | Bortnick | 260—453 |
| 2,757,183 | 7/56 | Irwin | 260—453 |
| 2,929,800 | 3/60 | Hill | 260—77.5 |

CHARLES B. PARKER, *Primary Examiner.*

H. N. BURSTEIN, L. J. BERCOVITZ, *Examiners.*